US010232617B2

(12) United States Patent
Sanada et al.

(10) Patent No.: US 10,232,617 B2
(45) Date of Patent: Mar. 19, 2019

(54) INK JET RECORDING METHOD, RECORDING HEAD, AND INK JET RECORDING APPARATUS

(71) Applicant: CANON KABUSHIKI KAISHA, Tokyo (JP)

(72) Inventors: Mikio Sanada, Kawasaki (JP); Shingo Okushima, Kawasaki (JP); Yoshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/622,815

(22) Filed: Jun. 14, 2017

(65) Prior Publication Data

US 2017/0361611 A1 Dec. 21, 2017

(30) Foreign Application Priority Data

Jun. 16, 2016 (JP) .................................. 2016-120100
May 23, 2017 (JP) .................................. 2017-102064

(51) Int. Cl.
   *B41J 2/14* (2006.01)
   *C09D 11/00* (2014.01)
   (Continued)

(52) U.S. Cl.
   CPC .......... *B41J 2/1433* (2013.01); *B41J 2/1404* (2013.01); *B41J 2/14032* (2013.01); *C09D 11/06* (2013.01);
   (Continued)

(58) Field of Classification Search
   CPC ...................... B41J 2/1433; B41J 2/145; B41J 2002/14467; B41J 2002/14483;
   (Continued)

(56) References Cited

U.S. PATENT DOCUMENTS 7,798,630 B2 * 9/2010 Nakazawa ................ B41J 2/06
                                                      347/102
8,573,758 B2 * 11/2013 Inoue .................... B41J 2/14145
                                                      347/84

(Continued)

FOREIGN PATENT DOCUMENTS

EP          0425280 A2     5/1991
EP          2371545 A1    10/2011
(Continued)

*Primary Examiner* — Thinh H Nguyen
(74) *Attorney, Agent, or Firm* — Canon U.S.A. Inc., IP Division

(57) ABSTRACT

An ink jet recording method is provided for recording an image by ejecting an ink from a recording head including a member defining an ejection orifice through which the ink is ejected, an ejection element configured to generate an energy used for ejecting the ink, and a first flow path communicating with a portion between the ejection orifice and the ejection element. The method includes ejecting an ink through the ejection orifice, and moving the ink from the first flow path to the portion between the ejection orifice and the ejection element separately from the ejecting of the ink. In this method, the ink is an aqueous ink containing a coloring material and a compound containing a chain hydrocarbon having a carbon number of 8 or more to 18 or less substituted by a hydroxy group or an anionic group.

23 Claims, 7 Drawing Sheets

(51) Int. Cl.
*C09D 11/06* (2006.01)
*C09D 11/322* (2014.01)
*C09D 11/38* (2014.01)
C09D 11/108 (2014.01)

(52) U.S. Cl.
CPC ............ C09D 11/322 (2013.01); C09D 11/38 (2013.01); *B41J 2202/12* (2013.01); *C09D 11/108* (2013.01)

(58) Field of Classification Search
CPC .......... B41J 2002/14346; B41J 2/14145; B41J 2002/14193; B41J 2/14201; B41J 2002/1404; B41J 2002/14032; B41J 2202/12; C09D 11/06; C09D 11/322; C09D 11/38; C09D 11/108
See application file for complete search history.

(56) References Cited

U.S. PATENT DOCUMENTS

| | | | |
|---|---|---|---|
| 2007/0105980 A1* | 5/2007 | Yamamoto | C09D 11/326 523/160 |
| 2011/0234685 A1 | 9/2011 | Yamazaki | |
| 2012/0113197 A1 | 5/2012 | Kashu | |
| 2014/0085381 A1 | 3/2014 | Yamamoto | |

FOREIGN PATENT DOCUMENTS

| | | |
|---|---|---|
| JP | 2002-533247 A | 10/2002 |
| JP | 2007-118611 A | 5/2007 |
| JP | 2011-202088 A | 10/2011 |
| JP | 2013-522414 A | 6/2013 |
| WO | 2004/003087 A1 | 1/2004 |
| WO | 2011/115614 A1 | 9/2011 |

* cited by examiner

INK JET RECORDING METHOD, RECORDING HEAD, AND INK JET RECORDING APPARATUS

BACKGROUND OF THE INVENTION

Field of the Invention

The present disclosure relates to an ink jet recording method, a recording head, and an ink jet recording apparatus.

Description of the Related Art

Ink jet recording apparatus including a line recording head (line head) are being used for high-speed image recording (see PCT Japanese Translation Patent Publication No. 2002-533247). A line head has ejection orifices through which an ink is ejected. Since the ejection orifices are arranged across the entire width of the recording medium, auxiliary ejection is difficult. Auxiliary ejection is one of the operations for recovering the function of the ejection orifices and is intended to suppress the increase in viscosity of the ink in ejection orifices the ejection frequency of which is low and thus to prevent the degradation of ejection properties. It is known that ink is moved in the vicinity of the ejection orifices to reduce or eliminate the clogging of the ejection orifices with foreign matter (see Japanese Patent Laid-Open No. 2007-118611). As an approach to an improved stability of ink ejection in the case of using a recording head in which ink is not moved, it is known that oleic acid is added to the ink (see PCT Japanese Translation Patent Publication No. 2013-522414 and Japanese Patent Laid-Open No. 2011-202088).

In the case of using a line head, further improvement of the stability of intermittent ink ejection is desired from the viewpoint of preventing the degradation of ejection properties at the ejection orifices the ejection frequency of which is low. However, the intermittent ejection stability of any structure disclosed in the above-cited patent documents Japanese Patent Laid-Open No. 2007-118611, PCT Japanese Translation Patent Publication No. 2013-522414, and Japanese Patent Laid-Open No. 2011-202088 is insufficient.

SUMMARY OF THE INVENTION

Accordingly, the present disclosure provides an ink jet recording method that can achieve a satisfactory stability of intermittent ink ejection even under severe conditions, such as in the case of using a line head. Furthermore, the present disclosure provides a recording head using the ink jet recording method and an ink jet recording apparatus using the ink jet recording method.

According to an aspect of the present disclosure, an ink jet recording method is provided for recording an image by ejecting an ink from a recording head including a member defining an ejection orifice through which the ink is ejected, an ejection element configured to generate an energy used for ejecting the ink, and a first flow path communicating with a portion between the ejection orifice and the ejection element. The method includes ejecting an ink through the ejection orifice, and moving the ink from the first flow path to the portion between the ejection orifice and the ejection element separately from the step of ejecting the ink. In this method, the ink is an aqueous ink containing a coloring material and a compound containing a chain hydrocarbon having a carbon number of 8 or more to 18 or less substituted by a hydroxy group or an anionic group.

According to another aspect of the present disclosure, there is provided a recording head including a member defining an ejection orifice through which an ink is ejected, an ejection element configured to generate an energy used for ejecting the ink, a first and a second flow path communicating with a portion between the ejection orifice and the ejection element, and a moving device different from the ejection element, configured to move the ink from the first flow path to the second flow path. The ink is an aqueous ink containing a coloring material and a compound containing a chain hydrocarbon having a carbon number of 8 or more to 18 or less substituted by a hydroxy group or an anionic group.

According to further aspect of the present disclosure, there is provided an ink jet recording apparatus including a recording head that includes a member defining an ejection orifice through which an ink is ejected, an ejection element configured to generate an energy used for ejecting the ink, a first and a second flow path communicating with a portion between the ejection orifice and the ejection element, and a moving device different from the ejection element, configured to move the ink from the first flow path to the second flow path. The ink is an aqueous ink containing a coloring material and a compound containing a chain hydrocarbon having a carbon number of 8 or more to 18 or less substituted by a hydroxy group or an anionic group.

The present disclosure provides an ink jet recording method that can achieve a satisfactory stability of intermittent ink ejection even under severe conditions, such as in the case of using a line head, and also provides a recording head using the ink jet recording method and an ink jet recording apparatus using the ink jet recording method.

Further features of the present disclosure will become apparent from the following description of exemplary embodiments with reference to the attached drawings.

DESCRIPTION OF THE EMBODIMENTS

Exemplary embodiments of the present disclosure will now be described in detail. In the following description, the aqueous ink used in the embodiments may be simply referred to as the ink. The first flow path and the second flow path may be integrally referred to as the flow path. Physical properties mentioned herein are those at a temperature of 25° C. unless otherwise specified. "(Meth)acrylic acid" refers to acrylic acid and methacrylic acid, and "(meth)acrylate" refers to an acrylate and a methacrylate.

In the ejection orifices the ejection frequency of which is low, water is evaporated from the ink while the ink is not being ejected. Hence, such evaporation of water through ejection orifices is one of the causes of degradation of the stability of intermittent ink ejection. Auxiliary ejection, which is one of the operations for recovering the function of ejection orifices, from the line head of PCT Japanese Translation Patent Publication No. 2002-533247 is not easier than from known serial recording heads or the like. Therefore, some sort of contraption is required of the line head for reducing the evaporation of water through the ejection orifices. In the recording head of Japanese Patent Laid-Open No. 2007-118611, in which the ink is moved in the vicinity of the ejection orifices, clean ink is supplied continuously to the vicinity of the ejection orifices, and a larger amount of water is likely to evaporate through the ejection orifices. This is the reason why stable intermittent ink ejection is not achieved in this recording head. In order to improve the stability of intermittent ink ejection, it is important to reduce the evaporation of water through the ejection orifices.

In the present disclosure, an ink is used which contains a compound that is stable in the ink not evaporating, but exhibits a hydrophilicity and a hydrophobicity with such a good balance that the compound is caused to be aligned at the interface between the ink and the atmosphere by the evaporation of water. The compound is uniformly aligned over the entire meniscus formed at each ejection orifice to form a coating by continuously supplying the compound to the vicinity of the ejection orifice by moving the ink in a flow path. This coating reduces the evaporation of water, and can be easily removed by ejection force; hence, the coating can improve intermittent ejection stability while keeping the ink from sticking around the ejection orifice.

Figure 1A:
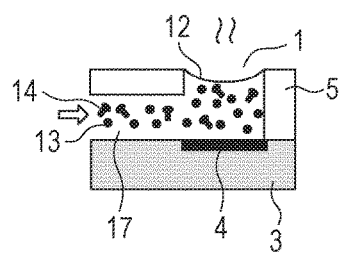
FIGS. 1A to 1F are schematic diagrams illustrating the mechanism how a compound is aligned at a meniscus in the case of using a recording head having a first flow path.
Figure 1B:
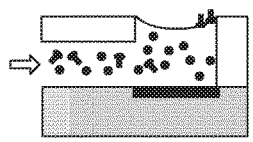
Figure 1C:
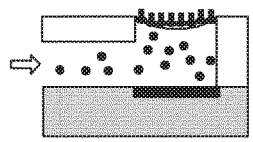
Figure 1D:
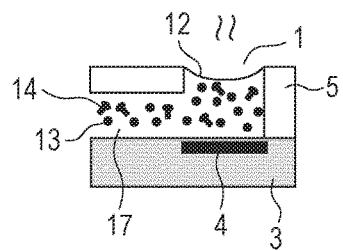

The effective mechanism how the compound is aligned over the meniscus will now be described with reference to schematically illustrated FIGS. 1A to 1F. FIGS. 1A to 1F are schematic diagrams illustrating the mechanism how a compound is aligned at a meniscus in the case of using a recording head having a first flow path. The first flow path 17 communicates with a portion between an ejection orifice 1 and an ejection element 4. The ink contains a coloring material 13 and a compound 14 containing a chain hydrocarbon having a carbon number of 8 or more to 18 or less substituted by a hydroxy group or an anionic group. As water is evaporated through the ejection orifice 1 (FIG. 1A), the compound 14 in the ink between the ejection orifice 1 and the ejection element 4 is aligned at the meniscus 12 of the ejection orifice 1 (FIG. 1B). At this time, since the ink in the first flow path 17 flows to the portion between the ejection orifice 1 and the ejection element 4, the portion of the ink between the meniscus 12 and the ejection element 4 is moved. Thus, the compound 14 is continuously supplied to the portion between the meniscus 12 and the ejection element 4, and the compound 14 is aligned at the meniscus 12. Consequently, the compound 14 forms a uniform coating over the meniscus 12. This uniform coating hinders water from evaporating through the ejection orifice.

Figure 1E:
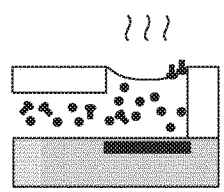
Figure 1F:
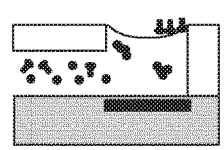

Suppose that the ink in the first flow path 17 does not flow to the portion between the ejection orifice 1 and the ejection element 4. As water evaporates through the ejection orifice 1 (FIG. 1D), the compound 14 in the portion of the ink between the ejection orifice 1 and the ejection element 4 is aligned at the meniscus 12 of the ejection orifice 1 (FIG. 1E). Unless the ink flows to the portion between the ejection orifice 1 and the ejection element 4, the ink between the meniscus 12 and the ejection element 4 is not moved, and accordingly, the compound 14 is not supplied to the portion between the meniscus 12 and the ejection element 4. Consequently, water further evaporates through the ejection orifice, and the compound 14 in the ink between the meniscus 12 and the ejection element 4 is further aligned at the meniscus. However, the evaporation of water causes the coloring material 13 to precipitate and thus increases the viscosity of the ink before the compound 14 forms a uniform coating over the meniscus 12. Consequently, stable intermittent ink ejection is not achieved.

The ink contains a compound containing a chain hydrocarbon having a carbon number of 8 or more to 18 or less substituted by a hydroxy group or an anionic group. The compound is amphiphilic because of the presence of a hydrophobic hydrocarbon and a hydrophilic hydroxy group or anionic group. The hydrophobic site having little or no affinity for water orients to the atmosphere, whereas the hydrophilic site having an affinity for water orients to the ink side. Thus, the compound forms a coating over the meniscus. If the carbon number of the hydrocarbon is less than 8, the compound is rather hydrophilic, and accordingly, the compound is not likely to be aligned at the meniscus when the ink between the meniscus and the ejection element evaporates. Thus, the compound does not form a uniform coating over the meniscus, and water evaporates through the ejection orifice. Consequently, stable intermittent ink ejection is not achieved. If the carbon number of the hydrocarbon exceeds 18, the compound is rather hydrophobic, and accordingly, the compound is not caused to be aligned at the meniscus by the evaporation of water. Consequently, stable intermittent ink ejection is not achieved. Although the inks of PCT Japanese Translation Patent Publication No. 2013-522414 and Japanese Patent Laid-Open No. 2011-202088 contain a compound similar to the compound used in the present disclosure, stable intermittent ink ejection is not achieved by these techniques. The reason for this is that the coloring material in these inks precipitates to increase the viscosity of the ink and forms aggregates that are likely to stick to the ejection orifice.

Figure 2C:
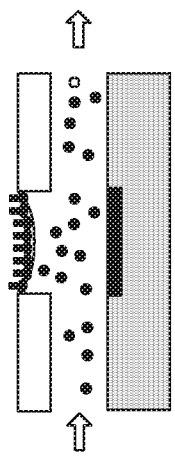
FIGS. 2A to 2F are schematic diagrams illustrating the mechanism how a compound is aligned at a meniscus in the case of using a recording head having a first flow path and a second flow path.
Figure 2B:
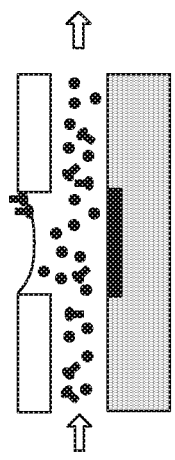
Figure 2A:
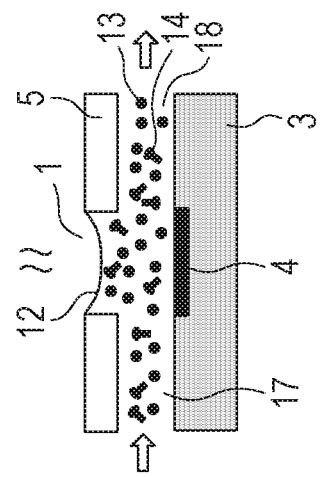
Figure 2F:
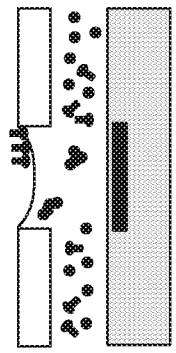
Figure 2E:
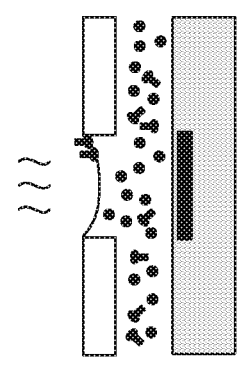
Figure 2D:
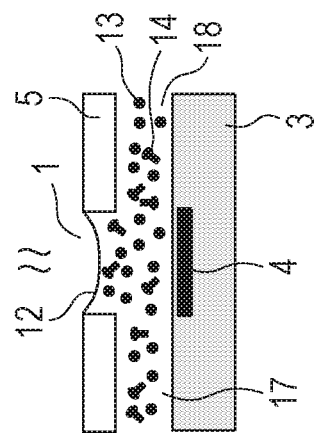

FIGS. 2A to 2F are schematic diagrams illustrating the mechanism how a compound is aligned at a meniscus in the case of using a recording head having a first flow path and a second flow path. The first flow path 17 and the second path 18 each communicate with the portion between the ejection orifice 1 and the ejection element 4. As water is evaporated through the ejection orifice 1 (FIG. 2A), the compound 14 in the ink between the ejection orifice 1 and the ejection element 4 is aligned at the meniscus 12 of the ejection orifice 1 (FIG. 2B). At this time, since the ink in the first flow path 17 flows to the second flow path 18 through the portion between the ejection orifice 1 and the ejection element 4, the portion of the ink between the meniscus 12 and the ejection element 4 is moved. Thus, the compound 14 is continuously supplied to the portion between the meniscus 12 and the ejection element 4, and the compound 14 is aligned at the meniscus 12. Consequently, the compound 14 forms a uniform coating over the meniscus 12. This uniform coating hinders water from evaporating through the ejection orifice. It is advantageous for efficiently moving the ink between the meniscus 12 and the ejection element 4 that the two flow paths communicate with the portion between the ejection orifice 1 and the ejection element 4. The following description will illustrate a recording head having the first flow path 17 and the second flow path 18 each communicating with the portion between the ejection orifice 1 and the ejection element 4, and an ink jet recording apparatus including the recording head by way of example. However, the subject matter of the present disclosure may be embodied in a recording head including a first flow path 17 communicating with the portion between the ejection orifice 1 and the ejection element 4, and an ink jet recording apparatus including such a recording head.

Figure 3:
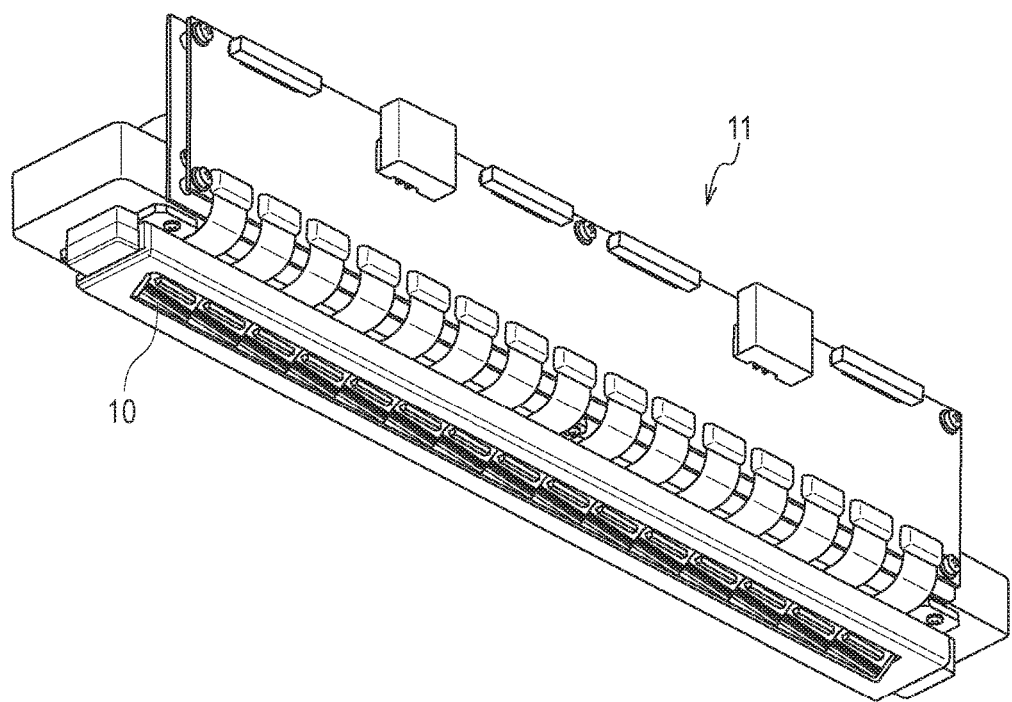
FIG. 3 is a perspective view of a line head.
Figure 4:
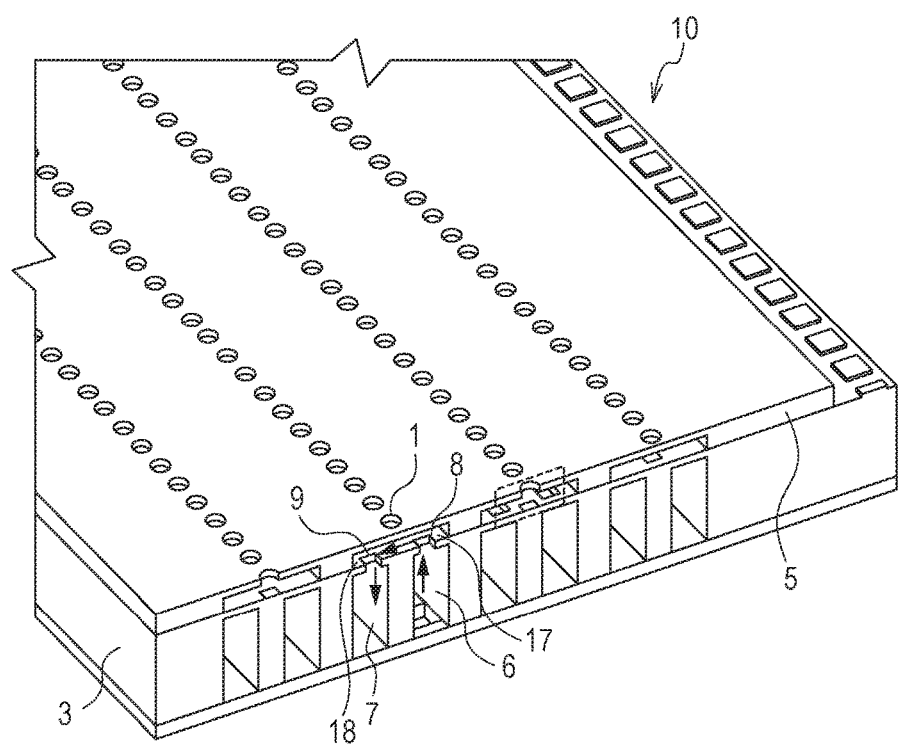
FIG. 4 is a perspective view of a section of an ejection element substrate.

FIG. 3 is a perspective view of a line head 11. The line head 11 includes ejection element substrates 10 in which ejection orifices are arranged. The ejection element substrates 10 are arranged in a straight line. Each ejection element substrate 10 is provided with ejection orifices each corresponding to any one of cyan (C), magenta (M), yellow (Y), and black (K) inks. FIG. 4 is a perspective view of a section of the ejection element substrate 10. Ejection orifices 1 are formed in an ejection orifice-forming member 5. A substrate 3 has ejection elements 4 (not shown in FIG. 4). The ejection orifice-forming member 5 and the substrate 3 define each first flow path 17 and each second flow path 18 for the inks. The first flow path 17 is the region from an inflow port 8 through which the ink is introduced from an inflow path 6 to the portion between the ejection orifice 1 and the ejection element 4. The second flow path 18 is the region from the portion between the ejection orifice 1 and the ejection element 4 to an outflow port 9 from which the ink is discharged to an outflow path 7. The ink is moved in the flow paths from the high-pressure side to the low-pressure side (in the direction indicated by the arrows shown in FIG. 4) by creating a pressure difference between the inflow port 8 and the outflow port 9 in such a manner that, for example, the inflow port 8 and the outflow port 9 are set at a higher pressure and a lower pressure, respectively. It will be described later how to create a pressure difference between the inflow port 8 and the outflow port 9. As just described, the ink enters the first flow path 17 through the inflow path 6 and the inflow port 8, then passes through the portion between the ejection orifice 1 and the ejection element 4, and flows to the outflow path 7 through the second flow path 18 and the outflow port 9.

The step of moving the ink from the first flow path to the portion between the ejection orifice and the ejection element is performed separately from the step of ejecting the ink through the ejection orifice. The moving of the ink is preferably independent of the operation intended to fill the portion between the ejection orifice and the ejection element with the ink. The ink jet recording method further preferably includes moving the ink from the portion between the ejection orifice and the ejection element to the second flow path. In the case of using a recording head not having the second flow path, the moving of the ink refers to only the step of moving the ink from the first flow path to the portion between the ejection orifice and the ejection element. The moving of the ink is preferably performed without discharging the ink through the ejection orifice. The discharging of the ink through the ejection orifice includes a recovery operation, such as auxiliary discharge or suction. The moving of the ink does not have to be performed during a recovery operation of the recording head. The ink during the moving of the ink is preferably moved with a moving device different from the ejection element.

In the embodiment described hereinafter, a thermal ejection technique is used in which the ejection element generates a thermal energy to form bubbles in the ink, thereby ejecting the ink. However, the concept of the present disclosure may be incorporated into a recording head using a piezoelectric ejection technique or any other ejection technique. Also, while the ink is circulated between an ink holder and the recording head in the present embodiment, other embodiments are not limited to this. For example, two ink holders may be provided on the upstream side and the downstream side of the recording head so as not to circulate the ink, and the ink in the flow path is moved by transmitting the ink from one of the ink holders to the other.

The recording head described hereinafter is a line head including ejection element substrates capable of ejecting four C, M, Y, and K color inks, arranged in a straight line. The line head may include ejection element substrates one for each of the C, M, Y, and K inks. In another embodiment, the concept of the present disclosure may be incorporated into a serial head that records images while being moved.

Figure 5:
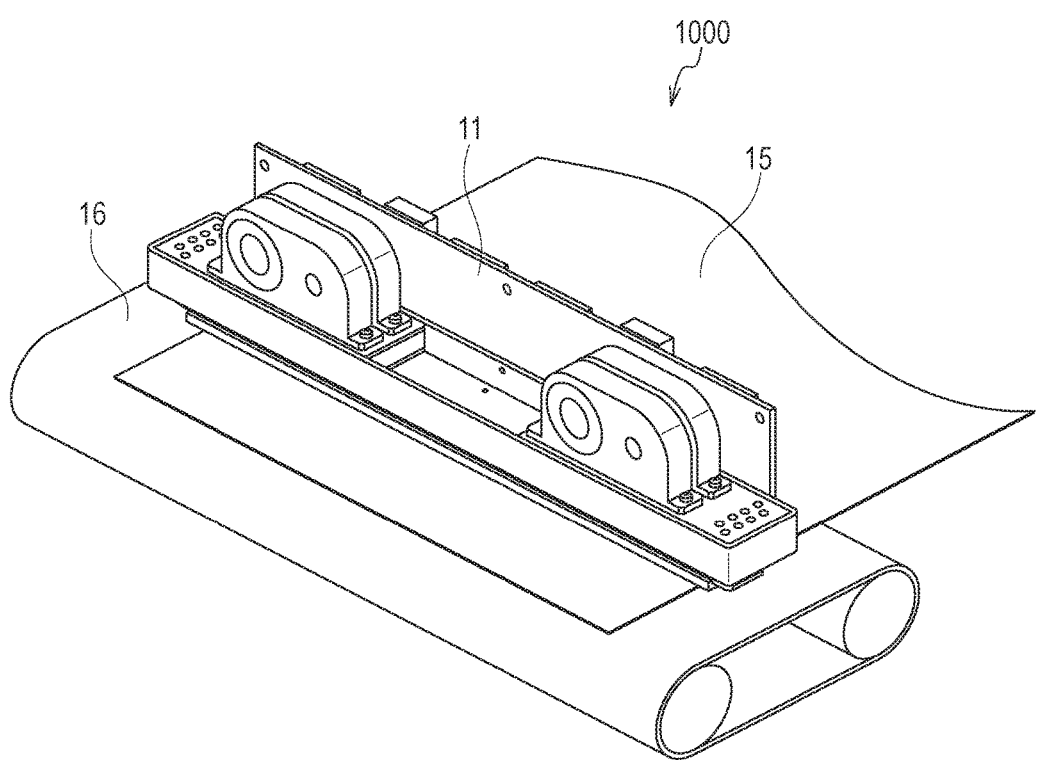
FIG. 5 is a perspective view of a main portion of an ink jet recording apparatus.

FIG. 5 is a perspective view of a main portion of an ink jet recording apparatus according to the present disclosure. The ink jet recording apparatus 1000 includes a conveying portion 16 that conveys a recording medium 15, and a line head 11 disposed perpendicular to the direction in which the recording medium is conveyed. In the ink jet recording apparatus 1000, the line head 11 records images while a plurality of recording media 15 are conveyed one after another or intermittently. The recording medium 15 is not limited to a cut piece of paper and may be a roll of paper.

The moving of the ink is preferably performed by moving the ink continuously or intermittently. It will now be described in detail how to move the ink continuously and how to move the ink intermittently.

Figure 6:
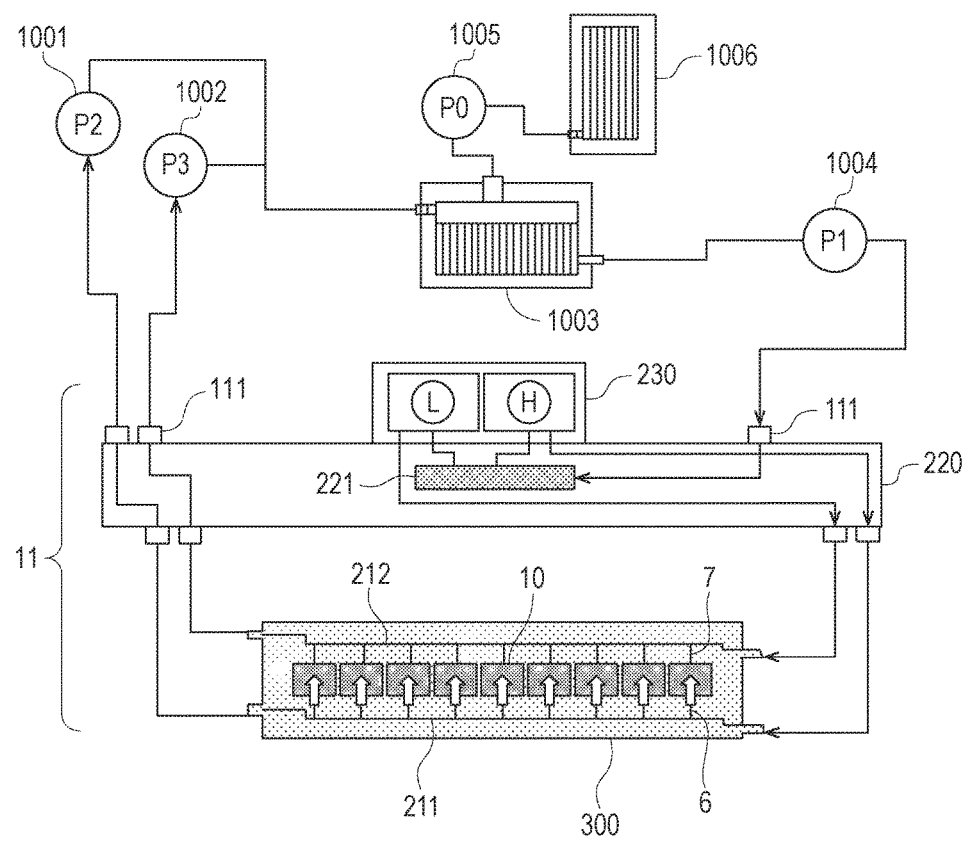
FIG. 6 is a schematic diagram of an ink supply system.

It will first be described how to move the ink continuously to the first flow path 17 and the second flow path 18 (FIG. 4) in the ejection element substrate 10, With reference to FIG. 6 illustrating an ink supply system. FIG. 6 illustrates a state where the line head 11 is connected to a first circulation pump (high-pressure side) 1001, another first circulation pump (low-pressure side) 1002, a buffer tank 1003, a second circulation pump 1004, and others for continuous liquid flow. Although FIG. 6 shows only a channel through which one of the C, M, Y, and K inks is moved for the sake of simple description, the actual line head 11 has flow channels corresponding to the four colors. The buffer tank 1003 connected to a main tank 1006 acting as the ink holder has an air communication port (not shown) through which air bubbles are discharged from the ink. The buffer tank 1003 is also connected to a replenishment pump 1005. The ink in the line head 11 is consumed by being ejected (or discharged) through the ejection orifices of the recording head for recording or suction recovery or the like. At this time, the replenishment pump 1005 delivers the ink to the buffer tank 1003 from the main tank 1006 according to the consumption.

The two first circulation pumps 1001 and 1002 draw the ink through a liquid connector 111 of the line head 11 and deliver the ink to the buffer tank 1003. The first circulation pumps each is preferably a positive displacement pump capable of quantitatively transmitting liquid. Examples of the positive displacement pump include a tube pump, a gear pump, a diaphragm pump, and a syringe pump. When an ejection unit 300 is driven, the high-pressure first circulation pump 1001 and the low-pressure first circulation pump 1002 allow the ink to flow in a common inflow path 211 and a common outflow path 212.

A negative pressure control unit 230 includes two pressure control mechanisms set for controlling to different pressures. The two negative pressure control mechanisms, that is, one on the relatively high-pressure side (designated by H in FIG. 6) and the other on the relatively low-pressure side (designated by L in FIG. 6), are each connected to the common inflow path 211 and outflow path 212 in the ejection unit 300 through a supply unit 220 which includes filter 221 removing foreign matters from the ink. The ejection unit 300 includes the common inflow path 211, the common outflow path 212, and inflow and outflow paths 6 and 7 communicating with the respective ejection element substrates 10. Since the inflow paths 6 and the outflow paths 7 communicate with the common inflow path 211 and the common outflow path 212, partial flows (arrows in FIG. 6) are created from the common inflow path 211 to the common outflow path 212 through the inner path of each ejection element substrate 10. The flow in the inner path of each ejection element substrate 10, which are indicated by the arrows in FIG. 4, is defined by the ink moving from the first flow path 17 to the second flow path 18 through the portion between the ejection orifice and the ejection element. The common inflow path 211 is connected to the pressure control mechanism H, and the common outflow path 212 is connected to the pressure control mechanism L; hence, a pressure difference is created between the inflow path 6 and the outflow path 7. Thus, a pressure difference is created between the inflow port 8 (shown in FIG. 4) communicating with the inflow path 6 and the outflow port 9 (shown in FIG. 4) communicating with the outflow path 7. For moving the ink by the pressure difference between the inflow port and the outflow port, the flow rate (mm/s) of the ink is preferably 0.1 mm/s or more to 10.0 mm/s or less.

The ink jet recording method disclosed herein includes the step of ejecting the ink through the ejection orifice. The ink in the first flow path is moved to the portion between the ejection orifice and the ejection element separately from the step of ejecting the ink. In addition, the ink may be moved during a recovery operation for the recording head. In this instance, since the ink is moved even during the recovery operation for the recording head, the ink is constantly moved. If the ink is constantly moved, water is easily evaporated, and the concentration of the circulating ink is likely to increase. Accordingly, the ink jet recording apparatus may be provided with a device capable of adding water into the ink when a predetermined time has elapsed, or a unit including a device capable of detecting the increase in concentration of the ink and a device capable of adding water into the ink, for reducing or eliminating the increase in concentration of the ink.

Figure 7A:
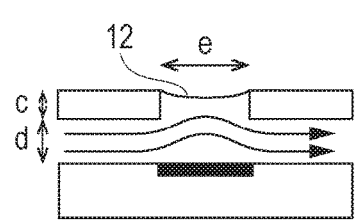
FIGS. 7A and 7B are schematic diagrams illustrating a state of moving ink in the vicinity of an ejection orifice.
Figure 7B:
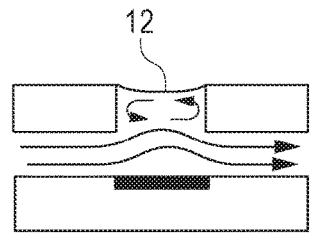

FIGS. 7A and 7B are schematic diagrams illustrating a state of moving ink in the vicinity of the ejection orifice. The ink moving in the vicinity of the ejection orifice in the flow path is roughly in either of the following two states. One is the state in which no circulation flow occurs in the vicinity of the meniscus, as shown in FIG. 7A; and the other is the state in which a circulation flow occurs in the vicinity of the meniscus, as shown in FIG. 7B. Even though the flow rate of the ink in the flow path is the same, the moving ink in the vicinity of the meniscus is in either of the two states. Which state the ink comes into is dominated by three factors: the thickness c (μm) of the ejection orifice-forming member, the height d (μm) of the flow paths, and the diameter e (μm) of the ejection orifice, rather than by the flow rate of the ink. When the height d and the diameter e are the same, a larger thickness c is more likely to cause a circulation flow to occur in the vicinity of the meniscus.

Figure 8:
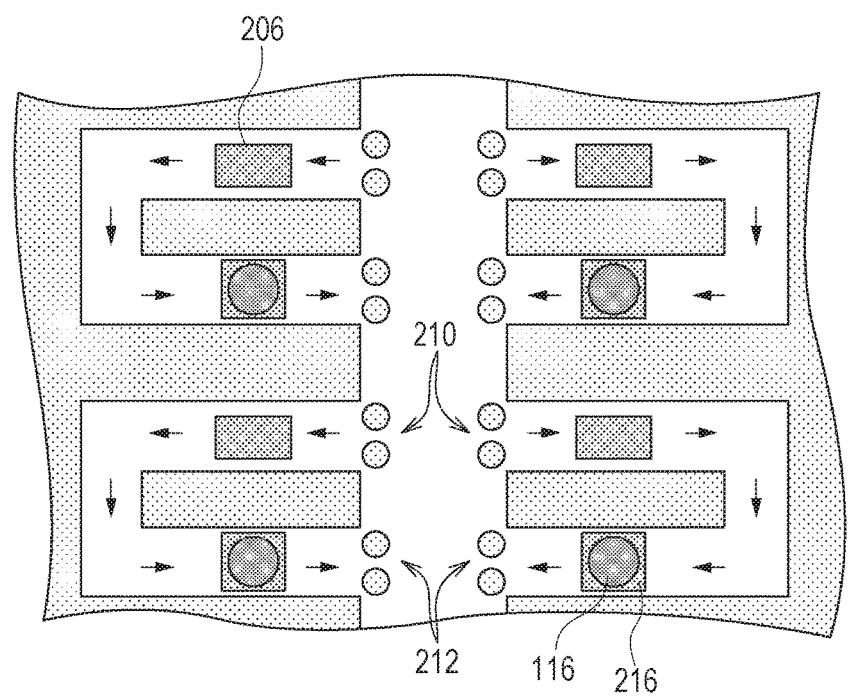
FIG. 8 is a sectional view of a line head.

The ink may be moved in an intermittent manner. How to move the ink intermittently will now be described with reference to FIG. 8 illustrating a sectional view of a line head. As the ink enters through each inflow port 210, the ink is moved in the directions indicated by arrows in FIG. 8 by the corresponding circulation pump 206 acting as an ink moving device and flows out through the corresponding outflow port 212. Hence, the ink is moved between the ejection orifice 116 and the ejection element 216. The circulation pump intermittently moves the ink. For intermittently moving the ink, the flow rate (m/s) of the ink is preferably 1.0 m/s or more to 10.0 m/s or less. If the recording head has only the first flow path, but does not have the second flow path, the flow rate is measured in the portion in the first flow path 17 between the substrate 3 and the ejection orifice-forming member 5 shown in FIG. 1A. In this instance, the flow rate of the ink moving in directions other than the direction of the arrow shown in FIG. 1A is not measured.

Ink

Each ink used in the embodiment disclosed herein contains a coloring material and a compound containing a chain hydrocarbon having a carbon number of 8 or more to 18 or less substituted by a hydroxy group or an anionic group. The inks used herein are not necessarily cured by an energy, such as UV radiation. Ingredients of the ink will now be described.

Coloring Material

The coloring material may be a pigment or a dye, and may be selected from among the known pigments and dyes. Pigments are more advantageous. The pigment used as the coloring material may be a carbon black or an organic pigment. The pigment may be composed of a single pigment or may contain two or more pigments. The coloring material content in the ink is preferably 0.10% by mass or more to 15.00% by mass or less, more preferably 1.00% by mass or more to 10.00% by mass or less.

The pigment may be of resin-dispersed type in which the pigment is dispersed with a resin acting as a dispersant (hereinafter referred to as resin dispersant), such as a resin-dispersed pigment using a resin dispersant or a microencapsulated pigment whose particles are covered with a resin. Alternatively, the pigment may be a resin-bonded self-dispersible pigment whose particles have surfaces to which an organic group of, for example, a resin, is chemically bonded. A self-dispersible pigment whose particles have surfaces to which a hydrophilic group is introduced may be used. In the aqueous ink, two or more pigments dispersed in different manners may be used in combination.

In the case of using a resin-dispersed pigment, it is advantageous that the molecule of the resin dispersant has a hydrophilic site and a hydrophobic site. Such a resin dispersant may be a resin produced by polymerization of a hydrophilic monomer, such as (meth)acrylic acid, with a hydrophobic monomer, such as styrene, ethyl (meth)acrylate, or benzyl (meth)acrylate. The resin dispersant preferably has an acid value of 50 mg KOH/g or more to 300 mg KOH/g or less. The polystyrene-equivalent weight average molecular weight (Mw), measured by gel permeation chromatography (GPC), of the resin dispersant is preferably 1,000 or more to 15,000 or less. The resin dispersant content in the ink is preferably 0.10% by mass or more to 10.00% by mass or less, more preferably 0.20% by mass or more to 4.00% by mass or less. The mass ratio of the resin dispersant to the pigment is preferably 0.10 or more to 1.00 or less.

In the case of using a self-dispersible pigment, another atomic group may be present between the surfaces of the pigment particles and the hydrophilic group. Examples of such an atomic group (—R—) include linear or branched alkylene groups having a carbon number of 1 to 12, arylene groups, such as a phenylene group and a naphthylene group, an amide group, a sulfonyl group, an amino group, an imino group, a carbonyl group, an ester group, an ether group, and a combined group of two or more of these groups.

Examples of the hydrophilic group capable of being introduced to the surfaces of the pigment particles include anionic groups, such as —COOM, —$SO_3M$, and —$PO_3M_2$, and nonionic groups, such as —OH. M's in these groups each represent H, Na, K, or NH$_4$. If the anionic group is in a salt form, part or the entirety of the salt may be dissociated in the aqueous ink.

Advantageously, the pigment is a self-dispersible pigment whose particles have surface to which a hydrophilic group is introduced. Since the hydrophilic group has a polarity, the self-dispersible pigment is hindered from forming aggregate compared with the case where the pigment is dispersed with a dispersant. Thus, the hydrophilic group helps improve the stability of intermittent ink ejection.

Compound

The compound contains a chain hydrocarbon having a carbon number of 8 or more to 18 or less substituted by a hydroxy group or an anionic group. Examples of the anionic group include a carboxy group, a sulfo group, a phosphate group, and a phosphonate group. Among these, the carboxy group is advantageous. The carboxy group is more easily bound to water molecules than the hydroxy group or other anionic groups even if water has evaporated, and hinders pigment particles from aggregating, thus helping improve the stability of intermittent ink ejection. More specifically, the compound may be a compound having a hydroxy group, such as lauryl alcohol, or a compound having a carboxy group, such as octanoic acid, stearic acid, or oleic acid. Among these, oleic acid is advantageous. Oleic acid is liquid at room temperature; hence when the compound thereof is aligned at the meniscus, oleic acid is less likely to be solid than stearic acid, which is solid at room temperature, accordingly unlikely to inhibit ink ejection. The compound content in the ink is preferably 0.05% by mass or more to 0.50% by mass or less, more preferably 0.10% by mass or more to 0.30% by mass or less. If the compound content is less than 0.05% by mass, such a content is so low that the compound is unlikely to form a coating over the meniscus. Consequently, water evaporation from the ink is not reduced, and the stability of intermittent ink ejection is likely to be insufficient. If the compound content exceeds 0.50% by mass, the coating of the compound becomes thick. Consequently, ink ejection is likely to be suppressed, and the stability of intermittent ink ejection is likely to be insufficient.

Resin

The ink preferably further contains a resin. A hydrophobic site of the resin is adsorbed to the surfaces of the coloring material particles and helps the pigment disperse, thus improving the stability of intermittent ink ejection. In the case of using a self-dispersible pigment having a hydrophilic group introduced to the surfaces of the particles thereof, the resin is physically adsorbed to a site that is not bound to the hydrophilic group and helps the pigment disperse. The resin content in the ink is preferably 1.00% by mass or more to 3.00% by mass or less, more preferably 1.00% by mass or more to 2.00% by mass or less.

The resin may have a hydrophilic unit and a hydrophobic unit. The hydrophilic unit is derived from a monomer having a hydrophilic group. The hydrophobic unit is derived from a monomer having a hydrophobic group. Advantageously, the hydrophilic unit accounts for 10.00% by mass or more to 30.00% by mass or less of the total mass of resin. Advantageously, the hydrophobic unit accounts for 70.00% by mass or more to 90.00% by mass or less of the total mass of resin.

The monomer having a hydrophilic group can be at least one selected from the group consisting of monomers having a carboxy group, monomers having a phosphonate group, monomers having a hydroxy group, and monomers having an ethylene oxide structure. Exemplary monomers having a carboxy group include monomers having an α,β-ethylenic unsaturated group, such as (meth)acrylic acid, maleic acid, itaconic acid, and fumaric acid. Exemplary monomers having a phosphonate group include monomers having an α, β-ethylenic unsaturated group, such as ethyl 2-phosphonate (meth)acrylate. The carboxylic acid and the monomer having a phosphonate group may be in the form of anhydride or salt thereof. Examples of such a salt include salts of an alkali metal salt, such as lithium, sodium, or potassium, and ammonium salts. Exemplary monomers having a hydroxy group include 2-hydroxyethyl (meth)acrylate, 2-hydroxypropyl (meth)acrylate, and other hydroxy-containing alkyl (meth)acrylates. Exemplary monomers having an ethylene oxide structure include methoxyethylene glycol (meth)acrylate and alkoxy polyethylene glycol (meth)acrylates having one to three ethylene oxide structures, such as methoxy polyethylene glycol (meth)acrylate. These monomers may be used singly or in combination. Advantageously, the monomer having a hydrophilic group is (meth)acrylic acid.

The monomer having a hydrophobic group may be a monomer having an aromatic group or an alkyl (meth)acrylate. Examples of the monomer having an aromatic group include styrene, α-methylstyrene, benzyl (meth) acrylate, and 2-phenoxyethyl (meth)acrylate. Styrene is advantageous as the monomer having an aromatic group. Examples of the alkyl (meth)acrylate include those having a carbon number of 1 or more to 4 or less, such as methyl (meth)acrylate, ethyl (meth)acrylate, n-propyl (meth)acrylate, isopropyl (meth)acrylate, butyl (meth)acrylate, and isobutyl (meth)acrylate. These may be used singly or in combination. Among those alkyl (meth)acrylates, butyl (meth)acrylate is advantageous.

Aqueous Medium

The ink disclosed herein is an aqueous ink containing an aqueous medium containing water. The aqueous medium may further contain a water-soluble organic solvent. The water is preferably deionized water (ion exchanged water). The water-soluble organic solvent may be selected from among, but is not limited to, solvents that can be used in ink jet inks, such as alcohols, glycols, glycol ethers, and nitrogen containing compounds. These water-soluble organic solvents may be used singly or in combination.

The water content in the ink is preferably 50.00% by mass or more to 95.00% by mass or less relative to the total mass of the ink. The water-soluble organic solvent content in the ink is preferably 3.00% by mass or more to 50.00% by mass or less relative to the total mass of the ink. If the water-soluble organic solvent content is less than 3.00% by mass, the ink is likely to be insufficient in stability of, for example, resistance to solidification when used in an ink jet recording apparatus. In contrast, if water-soluble organic solvent content is more than 50.00% by mass, the viscosity of the ink can increase to the extent that the ink cannot be stably ejected.

Other Ingredients

The ink according to an embodiment of the present disclosure may further contain a water-soluble organic compound that is solid at 25° C., such as urea, a urea derivative, trimethylolpropane, or trimethylolethane. Also, the ink may optionally contain other additives, such as a surfactant, a pH adjuster, an antifoaming agent, a corrosion inhibitor, a preservative, an antifungal agent, an antioxidant, an antireductant, and a chelating agent.

Physical Properties of Ink

The viscosity of the ink is preferably 1.0 mPa·s or more to 5.0 mPa·s or less, more preferably 1.0 mPa·s or more to 3.5 mPa·s or less, at 25° C. The static surface tension of the ink is preferably 28.0 mN/m or more to 45.0 mN/m or less at 25° C. The pH of the ink is preferably 7.0 or more to 9.0 or less.

EXAMPLES

The subject matter of the present disclosure will be further described in detail with reference to the following Examples and Comparative Examples. However, it is not limited to the Examples, nor particularly limited unless departing from the scope and spirit of the disclosure. In the following description, "part(s)" and "%" are on a mass basis unless otherwise specified.

Preparation of Pigment Dispersion Liquid A

Into the solution of 5.00 g of concentrated hydrochloric acid in 5.50 g of water, 4.00 g of 4-aminophthalic acid was added at 5° C. To the resulting solution being stirred in an ice bath to keep the temperature at 10° C. or less, the solution of 1.80 g of sodium nitrite in 9.00 g of water was added. After stirring for 15 minutes, 6.00 g of a carbon black having a specific surface area of 220 $m^2/g$ and a DBP absorption of 105 mL/100 g was added. After stirring for another 15 minutes, the resulting slurry was filtered through No. 2 filter paper (manufactured by Advantec), and the carbon black thus collected was sufficiently rinsed with water, followed by drying at 110° C. in an oven. Water was added to the resulting carbon black to yield pigment dispersion liquid A with a carbon black content (solid basis) of 20.00%.

Preparation of Pigment Dispersion Liquid B

Into a simple autoclave (TEM-U1000N, manufactured by Taiatsu Kogyo), 300.00 g of carbon black having a specific surface area of 220 $m^2/g$ and a DBP absorption of 105 mL/100 g and 2,000.00 g of water were each added, followed by stirring. Ozone gas generated from an ozone generator KQS-120 (manufactured by Kotohira) was introduced into the autoclave at a flow rate of 11.4 g/h, and thus the carbon black was subjected to ozone oxidation with stirring for 10 hours to yield a dispersion liquid. The dispersion liquid was adjusted to a pH of 8 to 9 with potassium hydroxide and then ultrafiltered to yield pigment dispersion liquid B with a carbon black content (solid basis) of 20.00%.

Preparation of Pigment Dispersion Liquid C

In ion exchange water was dissolved 8.00 parts of styrene-acrylic acid copolymer having an acid value of 120 mg OH/g and a weight average molecular weight of 8,000 neutralized with a sodium hydroxide aqueous solution having the same acid value and the same moles as the copolymer. In the resulting solution were mixed 20.00 parts of a carbon black having a specific surface area of 220 $m^2/g$ and a DBP absorption of 105 mL/100 g and 72.00 parts of ion exchanged water. The resulting mixture was agitated for 3 hours for dispersion in a batch-type vertical sand mill (manufacture by Aimex) charged with 200.00 parts of zirconia beads having a diameter of 0.3 mm. Then, the resulting dispersion liquid was centrifuged for removing large particles and further subjected to pressure filtration through a microfilter having a pore size of 3.0 μm (manufactured by Fujifilm) to yield pigment dispersion liquid C. Pigment dispersion liquid C was a type of dispersion in which the carbon black was resin-dispersed in water (pigment content: 15.00%, resin content: 6.40%).

Synthesis of Resin

Styrene-n-butyl acrylate-acrylic acid copolymer (mole ratio: 33:44:23) having an acid value of 120 mg OH/g and a weight average molecular weight of 5,000 was neutralized with a potassium hydroxide aqueous solution having the same acid value and the same moles as the copolymer. An appropriate amount of ion exchanged water was added to the resulting copolymer to yield a resin solution with a resin content (solid basis) of 10.00%.

Preparation of Inks 1 to 17

The ingredients shown in Table 1 were mixed and sufficiently stirred, and the resulting mixture was subjected to pressure filtration through a microfilter having a pore size of 3.0 μm (manufactured by Fujifilm). Thus, inks 1 to 17 were prepared. Acetylenol E100 shown in Table 1 is a nonionic surfactant produced by Kawaken Fine Chemical.

TABLE 1

| | Ink Composition | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Pigment dispersion liquid A | 50.00 | | | | 50.00 | 50.00 | 50.00 | 50.00 | 50.00 | 50.00 | 50.00 | 50.00 | 50.00 | 50.00 | 50.00 | 50.00 | 50.00 |
| Pigment dispersion liquid B | | 50.00 | | | | | | | | | | | | | | | |
| Pigment dispersion liquid C | | | 50.00 | | | | | | | | | | | | | | |
| C.I. Acid Red 289 | | | | 10.00 | | | | | | | | | | | | | |
| Resin solution | 15.00 | 15.00 | 15.00 | | | 15.00 | 15.00 | 15.00 | 15.00 | 15.00 | 15.00 | 15.00 | 15.00 | 15.00 | 15.00 | 15.00 | 15.00 |
| Glycerin | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 2-Pyrrolidone | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| 1,2-Hexanediol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Octanoic acid | | | | | | | 0.20 | | | | | | | | | | |
| Dodecanoic acid | | | | | | | | 0.20 | | | | | | | | | |
| Lauryl alcohol | | | | | | 0.20 | | | | | | | | | | | |
| Stearic acid | | | | | | | | | 0.20 | | | | | | | | |
| Oleic acid | 0.20 | 0.20 | 0.20 | 0.20 | 0.20 | | | | | | 0.03 | 0.05 | 0.50 | 0.60 | | | |
| Octane | | | | | | | | | | | | | | | | 0.20 | |

TABLE 1-continued

| | Ink Composition | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Hexanoic acid | | | | | | | | | | | | | | | | 0.20 | |
| Docosanoic acid | | | | | | | | | | | | | | | | | 0.20 |
| Acetylenol E100 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Ion exchanged water | 6.80 | 6.80 | 46.80 | 21.80 | 21.80 | 6.80 | 6.80 | 6.80 | 6.80 | 6.97 | 6.95 | 6.50 | 6.40 | 7.00 | 6.80 | 6.80 | 6.80 |

Evaluation

Inks 1 to 17 were each introduced into the ink holder of an ink jet recording apparatus including the main portion shown in FIG. 5 for evaluation. The following recording heads 1 to 4 were used for recording images. Recording heads 1 to 3 each have the first and the second flow path. Recording head 4 has the first flow path. Recording head 1 intermittently moves the ink by using the structure shown in FIG. 8. The flow rate of the ink in recording head 1 was 5.0 m/s. Recording head 2 continuously moves the ink by using the structure shown in FIG. 6, without allowing any circulation flow to occur in the vicinity of the meniscus, as shown in FIG. 7A. The flow rate of the ink in recording head 2 was 5.0 mm/s. Recording head 3 continuously moves the ink by using the structure shown in FIG. 6, allowing a circulation flow to occur in the vicinity of the meniscus, as shown in FIG. 7B. The flow rate of the ink in recording head 3 was 5.0 mm/s. Recording heads 1 to 3 each have the first and the second flow path, whereas recording head 4 has the first flow path and no second flow path and intermittently moves the ink. The flow rate of the ink in recording head 4 was 5.0 m/s. For recording head 4, the flow rate was measured in the portion in the first flow path 17 between the substrate 3 and the ejection orifice-forming member 5 shown in FIG. 1A. At this time, the flow rate of the ink moving in directions other than the direction of the arrow shown in FIG. 1A was not measured. For recording head 1 used in Comparative Example 1, circulation pumps were not operated, and therefore the ink was not moved. For each of recording heads 1 to 3, after being allowed to stand at 45° C. for 10 minutes, the head ejected an ink through all the ejection orifices in each ejection element substrate 10 shown in FIG. 3 for the ink to record a ruled line having a width corresponding to 1 dot across the recording medium. Hence, the ruled line was recorded in the direction perpendicular to the direction in which the recording medium is conveyed. The recorded ruled line was visually observed and evaluated according to the following criteria. For rating for the evaluation, AA, A, and B represent acceptable levels, and C represents unacceptable level. Table 2 shows the results of the evaluation. Comparative Examples 3 and 5 were not able to be evaluated because the compound in the ink was not dissolved and the ink gelled.

AA: The ruled line was perfect.

A: The ruled line was bent in some portions, but there was no point where ejection failure occurred.

B: There were some points where ejection failure occurred, but the recorded image was recognized as a ruled line.

C: There were many points where ejection failure occurred, and some portions of the line was not recognized as a ruled line.

TABLE 2

Test Results

| | Ink Number | Recording head number | Intermittent ejection stability |
|---|---|---|---|
| Example | | | |
| 1 | 1 | 1 | AA |
| 2 | 2 | 1 | AA |
| 3 | 3 | 1 | B |
| 4 | 4 | 1 | A |
| 5 | 5 | 1 | A |
| 6 | 6 | 1 | B |
| 7 | 7 | 1 | A |
| 8 | 8 | 1 | A |
| 9 | 9 | 1 | A |
| 10 | 10 | 1 | A |
| 11 | 11 | 1 | AA |
| 12 | 12 | 1 | AA |
| 13 | 13 | 1 | A |
| 14 | 1 | 2 | A |
| 15 | 1 | 3 | A |
| 16 | 1 | 4 | AA |
| Comparative Example | | | |
| 1 | 1 | 1 | C |
| 2 | 14 | 1 | C |
| 3 | 15 | 1 | No rating |
| 4 | 16 | 1 | C |
| 5 | 17 | 1 | No rating |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120100 filed Jun. 16, 2016 and No. 2017-102064 filed May 23, 2017, which are hereby incorporated by reference herein in their entirety.

What is claimed is:

1. An ink jet recording method for recording an image by ejecting an ink from a recording head including a member defining an ejection orifice through which the ink is ejected, an ejection element configured to generate an energy used for ejecting the ink, and a first flow path communicating with a portion between the ejection orifice and the ejection element, the method comprising:

ejecting an ink through the ejection orifice; and moving the ink from the first flow path to the portion between the ejection orifice and the ejection element, separately from the ejecting of the ink, wherein the ink is an aqueous ink comprising a coloring material and a compound containing a chain hydrocarbon having a carbon number of 8 or more to 18 or less substituted by a hydroxy group or an anionic group, and wherein the moving of the ink is performed separately from an operation to fill the portion between the ejection orifice and the ejection element with the ink.

2. The ink jet recording method according to claim 1, wherein the moving of the ink is performed without discharging the ink through the ejection orifice.

3. The ink jet recording method according to claim 1, wherein the moving of the ink is performed by a moving device different from the ejection element.

4. The ink jet recording method according to claim 1, wherein the ink in the portion between the ejection orifice and the ejection element is circulated between the portion and the outside of the portion.

5. The ink jet recording method according to claim 1, wherein the coloring material comprises a pigment.

6. The ink jet recording method according to claim 5, wherein the pigment comprises a self-dispersible pigment.

7. The ink jet recording method according to claim 1, wherein the compound has a carboxy group.

8. The ink jet recording method according to claim 1, wherein the compound comprises oleic acid.

9. The ink jet recording method according to claim 1, wherein the content of the compound in the ink is 0.05% by mass or more to 0.50% by mass or less relative to the total mass of the ink.

10. The ink jet recording method according to claim 1, wherein the ink further comprises a resin.

11. The ink jet recording method according to claim 10, where the resin content in the ink is 1.00% by mass or more to 3.00% by mass or less.

12. The ink jet recording method according to claim 11, wherein the resin has a hydrophilic unit and a hydrophobic unit.

13. The ink jet recording method according to claim 12, wherein the hydrophilic unit is derived from a monomer having at least one member selected from the group consisting of a carboxy group, a phosphonate group, a hydroxy group, and an ethylene oxide structure.

14. The ink jet recording method according to claim 12, wherein the hydrophobic unit is derived from a monomer having an aromatic group or an alkyl (meth) acrylate.

15. The ink jet recording method according to claim 1, wherein the moving of the ink is performed by continuously moving the ink or intermittently moving the ink.

16. The ink jet recording method according to claim 15, wherein the ink is continuously moved at a flow rate of 0.1 mm/s or more to 10.0 mm/s or less, or intermittently moved at a flow rate of 1.0 m/s or more to 10.0 m/s or less.

17. The ink jet recording method according to claim 15, wherein the moving of the ink is performed by intermittently moving the ink.

18. The ink jet recording method according to claim 1, wherein the energy is a thermal energy.

19. The ink jet recording method according to claim 1, wherein the recording head is a line head.

20. The ink jet recording method according to claim 1, wherein the coloring material content in the ink is 1.00% by mass or more to 10.00% by mass or less.

21. An ink jet recording method for recording an image by ejecting an ink from a recording head including a member defining an ejection orifice through which the ink is ejected, an ejection element configured to generate an energy used for ejecting the ink, and a first and a second flow path communicating with a portion between the ejection orifice and the ejection element, the method comprising:

ejecting an ink through the ejection orifice; and moving the ink from the first flow path to the second flow path through the portion between the ejection orifice and the ejection element, separately from the ejecting of the ink, wherein the ink is an aqueous ink comprising a coloring material and a compound containing a chain hydrocarbon having a carbon number of 8 or more to 18 or less substituted by a hydroxy group or an anionic group.

22. A recording head, comprising:

a member defining an ejection orifice through which an ink is ejected;

an ejection element configured to generate an energy used for ejecting the ink;

a first and a second flow path communicating with a portion between the ejection orifice and the ejection element; and a moving device different from the ejection element, configured to move the ink from the first flow path to the second flow path, wherein the ink is an aqueous ink comprising a coloring material and a compound containing a chain hydrocarbon having a carbon number of 8 or more to 18 or less substituted by a hydroxy group or an anionic group.

23. An ink jet recording apparatus comprising:

a member defining an ejection orifice through which an ink is ejected;

an ejection element configured to generate an energy used for ejecting the ink;

a first and a second flow path communicating with a portion between the ejection orifice and the ejection element; and a moving device different from the ejection element, configured to move the ink from the first flow path to the second flow path, wherein the ink is an aqueous ink comprising a coloring material and a compound containing a chain hydrocarbon having a carbon number of 8 or more to 18 or less substituted by a hydroxy group or an anionic group.

* * * * *